G. H. McFEATERS.
PIPE HANGER.
APPLICATION FILED DEC. 23, 1918.
1,303,345.
Patented May 13, 1919.
2 SHEETS—SHEET 1.
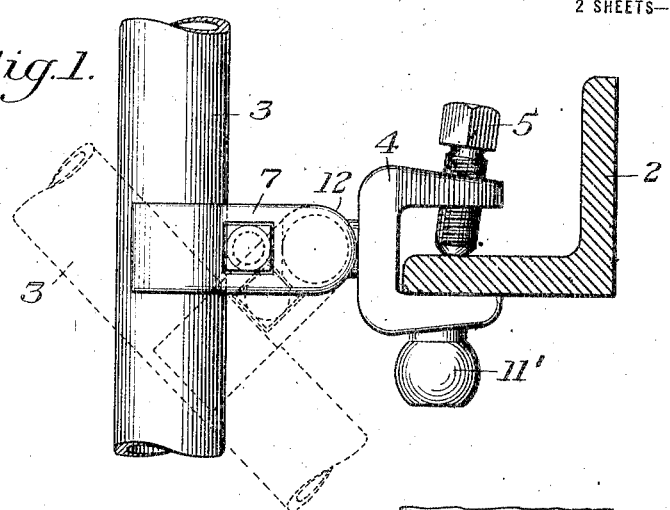
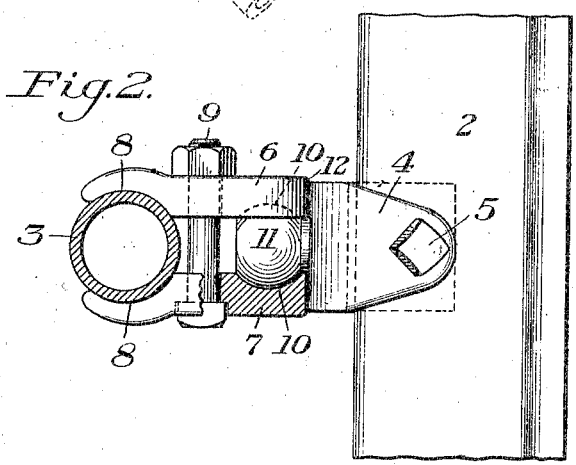
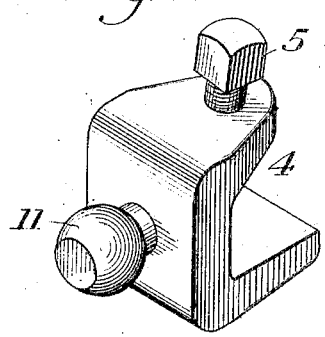
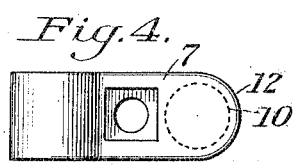
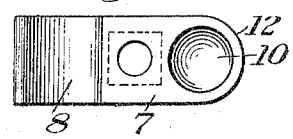
WITNESSES
R A Balderson
J. B. Fleming
INVENTOR
Geo. H. McFeaters
by Bakewell, Byrnes, Parmelee
Attys G. H. McFEATERS.
PIPE HANGER.
APPLICATION FILED DEC. 23, 1918.
1,303,345.
Patented May 13, 1919.
2 SHEETS—SHEET 2.
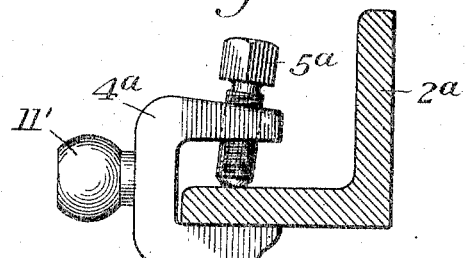
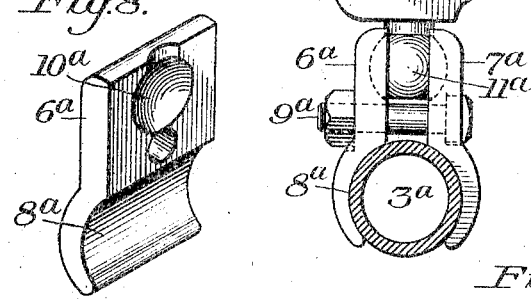
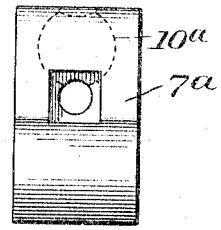
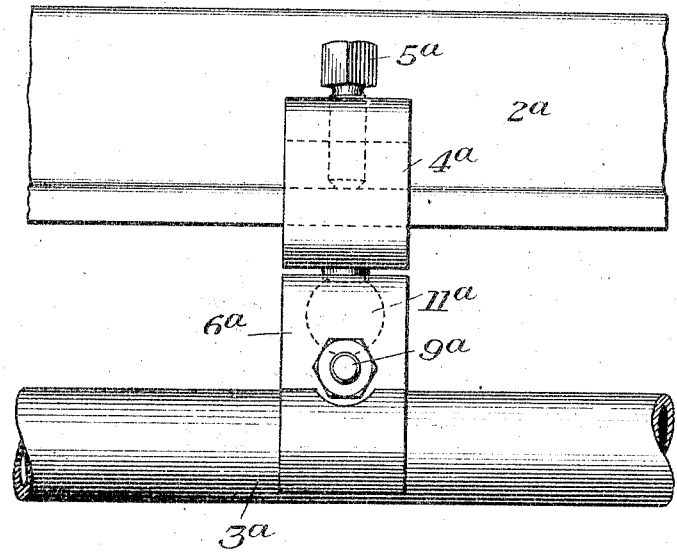
WITNESSES
INVENTOR

UNITED STATES PATENT OFFICE.

GEORGE H. McFEATERS, OF JOHNSTOWN, PENNSYLVANIA.

PIPE-HANGER.

1,303,345.   Specification of Letters Patent.   Patented May 13, 1919.

Application filed December 23, 1918. Serial No. 267,905.

*To all whom it may concern:*

Be it known that I, GEORGE H. McFEATERS, a citizen of the United States, residing at Johnstown, in the county of Cambria and State of Pennsylvania, have invented a new and useful Improvement in Pipe-Hangers, of which the following is a full, clear, and exact description, reference being had to the accompanying drawings, forming part of this specification, in which:

Figure 1 is a sectional plan view illustrating one form of my pipe hanger.

Fig. 2 is a sectional elevation of the same.

Fig. 3 is a perspective view showing one member of the hanger.

Figs. 4 and 5 are plan views of the parts constituting the other member of the hanger.

Figs. 6 and 7 are views similar to Figs. 1 and 2, respectively, but showing a modification.

Fig. 8 is a perspective view of one of the pipe clamping jaws shown in Figs. 6 and 7, and Fig. 9 is a plan view of the other of said jaws.

My invention has relation to pipe hangers and is designed to provide a simple and convenient form of hanger, especially adapted for carrying conduit or pipes along the structural frame work of factory or mill buildings. A further object of my invention is to provide a hanger of this character which can be manufactured at a comparatively low cost; which is convenient in use and which will enable the pipes to be supported at various angles to the frame members to which the hanger is attached.

The nature of my invention will be best understood by reference to the accompanying drawings in which I have shown two embodiments of my invention and which will now be described, it being premised, however, that my invention is susceptible to other embodiments and that various changes can be made in the details of construction, arrangement and combination of the parts without departing from the spirit and scope of my invention, as defined in the appended claims.

Referring first to that form of my invention shown in Figs. 1 to 5: This hanger comprises two clamps, one of which is designed to engage a frame member 2 which forms the support, and the other of which is arranged to engage the pipe 3 to be supported. The clamp which engages the support comprises the rigid jaws 4 adapted to embrace a flange of the beam 2, one of the jaws having a clamping screw 5 seated therein. The clamp which engages the pipe 3 consists of two jaw members 6 and 7, each having a concaved portion 8 to receive the pipe, and registering seats for a transversely extending clamping bolt 9. The inner face of each jaw 6 and 7 is also formed with a concavity 10 to receive a ball projection 11 on the first described clamp member. This engagement forms a swivel ball-and-socket connection between the two clamps, whereby the clamp which engages the pipe may be rotated and also rocked on the ball 11 to enable the pipe to extend at any desired angle to the beam 2. When the nut of the bolt 9 is tightened, it will not only firmly secure the pipe between the jaws 6 and 7, but said jaws will also be firmly secured in the desired adjustment on the ball 11. In order to permit the jaw 6 to be swung in a vertical plane when the nut 9 is loosened, the inner ends of said jaws adjacent to the outer face of the clamp 4 are rounded, as shown at 12. I may also provide the clamp 4 with a second ball connection 11' at right angles to the projection 11 and to which the other clamp may be engaged, thus giving the device a more universal character.

While Fig. 1 has been described as being a sectional plan view, and Fig. 2 a sectional elevation, it will be apparent that said views might, with equal propriety, be described respectively as being a sectional elevation and a sectional plan, since the frame member 2 may be considered as running either vertically or horizontally, or in fact at any other angle.

The form of my invention shown in Figs. 6 to 9, inclusive, is substantially the same as that first described, except that the pipe clamping jaws 6ᵃ and 7ᵃ are mounted for rotary movement only on the ballhead 11ᵃ, and are not capable of being rocked to any extent on such head. The parts in these figures which correspond to similar parts in the form first described, are given the same reference character with the index *a*.

It will be readily apparent that my invention provides a simple and efficient form of pipe clamp, capable of universal use which can be quickly and readily applied to or detached from supporting frame work and which will permit the device to be carried and supported at any desired angle.

I claim:

1. A pipe hanger, comprising a member having a support engaging clamp, a ball connected thereto, jaw members each having sockets at one end for the reception of the ball, the other end of each jaw member having a recess for the reception of the pipe, and means intermediate of the ends of the jaw for simultaneously clamping said jaws about the ball and the pipe, substantially as described.

2. A pipe hanger, comprising a member having fixed support engaging jaws, means on said jaws for clamping the same to a support, a ball connected to said member, jaw members each having sockets at one end for the reception of the ball, the other end of each jaw member having a recess for the reception of a pipe, and means for drawing said jaw members toward each other to clamp the ball and pipe, substantially as described.

3. A pipe hanger, comprising a jaw member having a support engaging clamp, a plurality of balls connected thereto in different vertical and horizontal planes, jaw members each having sockets at one end for the reception of one of the balls, the other end of each jaw member having a recess for the reception of a pipe, and a through bolt extending through both of the jaw members for clamping the jaws about the ball member and the pipe, substantially as described.

4. A pipe hanger, comprising a member having jaws adapted to embrace a support, and having a ball-shaped projection on one of the jaws, a clamping screw carried by the other of said jaws, and a pipe clamp comprising jaws formed with sockets for engagement with the ball projection, and clamping bolts for said jaws, substantially as described.

In testimony whereof, I have hereunto set my hand.

GEORGE H. McFEATERS.